US006455450B1

(12) United States Patent
Hofmann

(10) Patent No.: US 6,455,450 B1
(45) Date of Patent: Sep. 24, 2002

(54) PAPER MACHINE FELT

(75) Inventor: Hans Hofmann, Hurtgenwald (DE)

(73) Assignee: Thomas Josef Heimbach Gesellschaft mit beschrankter Haftung & Co. (DE)

( * ) Notice: Subject to any disclaimer, the term of this patent is extended or adjusted under 35 U.S.C. 154(b) by 162 days.

(21) Appl. No.: 09/598,831

(22) Filed: Jun. 21, 2000

(30) Foreign Application Priority Data

Jul. 1, 1999 (DE) .......................... 199 30 464

(51) Int. Cl.⁷ .................... D04H 1/00; D04H 13/00; D04H 3/00; D04H 5/00
(52) U.S. Cl. ................ 442/415; 442/320; 442/403; 442/414; 442/361; 442/304; 442/319
(58) Field of Search ................ 442/320, 403, 442/414, 415, 361, 304, 319

(56) References Cited

U.S. PATENT DOCUMENTS 5,783,501 A * 7/1998 Schuetze et al. ......... 162/358.1
5,925,221 A * 7/1999 Sayers et al. ........... 139/383 R

* cited by examiner

*Primary Examiner*—Terrel Morris
*Assistant Examiner*—Norca L. Torres
(74) *Attorney, Agent, or Firm*—Liniak, Berenato, Longacre & White, LLC

(57) ABSTRACT

A paper machine felt having at least one nonwoven layer made of plastic fibers, wherein there is present in the nonwoven layer or in at least one of the nonwoven layers a fiber combination in which a portion of the plastic fibers is made of a material A that has a water uptake of more than 10 wt % (saturation value, 23° C.) and in which the majority of the plastic fibers is made of a material B that has a water uptake of no more than 10 wt % (saturation value, 23° C.).

14 Claims, 1 Drawing Sheet

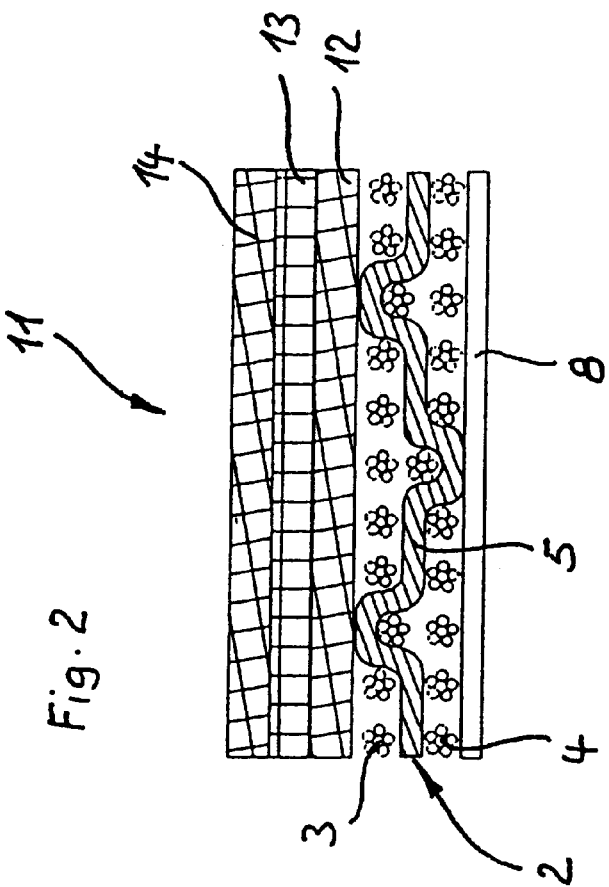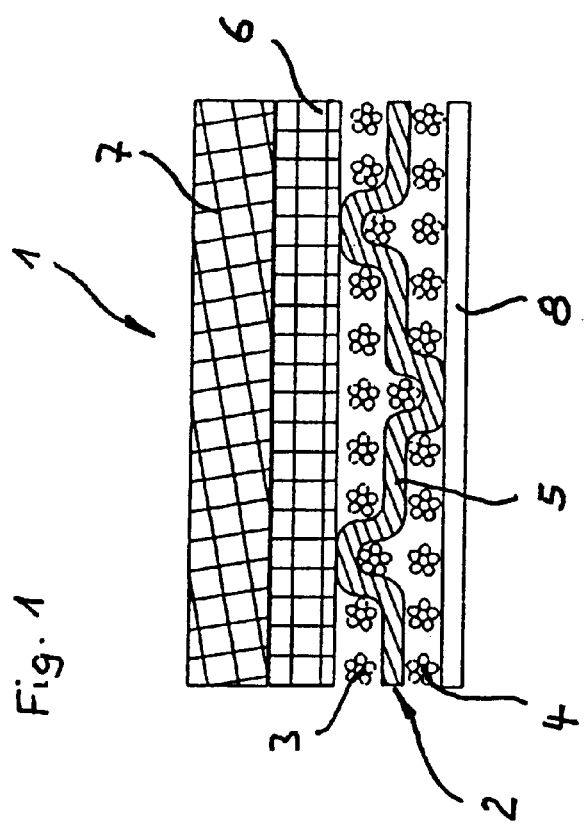

PAPER MACHINE FELT

The invention concerns a paper machine felt for use in particular in the press section of a paper machine.

The conventional paper machine felt generally comprises a support in the form of a woven fabric, knitted fabric, or thread layer, and a nonwoven fabric needle-felted thereonto on one or two sides. The paper-side nonwoven layer can be of two-stage configuration, in that the nonwoven layer adjacent to the support has coarser fibers than the nonwoven layer forming the paper side.

Materials suitable for the fibers from which the support is manufactured include various plastics, predominantly polyamides (cf. U.S. Pat. No. 4,564,985) and polyesters. In the former case, polyamide-6 and polyamide-6,6 grades have mostly been utilized, in particularly also for the fibers of the nonwoven fabric. In EP-B-0 287 297 it has been proposed to use fibers made of polyamide-12 for the nonwoven fabric, since these fibers have greater resistance to compaction due to their lower water uptake, and moreover are more abrasion-resistant than the polyamide-6 types. Polyamide-11 has similar properties (cf. EP-B-0 372 769).

One problem with the known paper machine felts is that their permeability deteriorates during operation because of compaction of the felt and deposits, even if polyamide-11 or polyamide-12 grades are used. This is counteracted by designing the nonwoven fabric to be very open. This in turn, however, has the disadvantage that the paper machine felt is too open in the initial phase; this promotes, in particular, a tendency for the paper web to become rewetted at the end of the press section. To solve this problem, it has been proposed to mix into the nonwoven fabric soluble fibers that, after a certain operating period, can be dissolved out using a suitable liquid so that the original permeability can thereby be restored (cf. EP-A-0 303 798, DE-A-34 19 708). Such fibers are expensive, however, as is the use of the liquid solvent.

It is the object of the invention to configure paper machine felts in such a way that they have a more consistent permeability over their service life, with no need for additional actions during operation for that purpose.

This object is achieved, according to the present invention, in that there is present in the nonwoven layer or in at least one of the nonwoven layers a fiber combination in which a portion of the plastic fibers is made of a material A that has a water uptake of more than 10 wt % (saturation value, 23° C.) and in which the majority of the plastic fibers is made of a material B that has a water uptake of no more than 10 wt % (saturation value, 23° C.). The basic idea of the invention is thus to provide in at least one nonwoven layer a fiber combination having plastic fibers with different water uptake properties, the majority of the plastic fibers being constituted by those having the lower water uptake. In this context, the difference between the two materials A and B in terms of water uptake capability should be distinct.

The effect of the fiber combination is that the fibers made of material A, because of their high water uptake, swell up substantially more than those made of material B. Because of this swelling, the paper machine felt acquires the desired permeability only in the paper machine. Because material A is not as strong as the other plastic fibers of the nonwoven layer, however, and in particular not as strong as material B, the fibers made of material A gradually decompose, due to internal friction as well as chemical influences, as the service life proceeds, counteracting the age-related densification of the paper machine felt resulting from deposits and/or compaction. By correspondingly adjusting the proportion of plastic fibers made of material A—the proportion by weight should preferably be between 3 and 25%—and the size of the fibers, it is possible to adjust the permeability behavior for minimal change over the operating time.

In an embodiment of the invention, provision is made for the fiber combination to be present in a paper-side nonwoven layer. As a result, after the plastic fibers have swollen a kind of barrier layer forms, which reduces rewetting of the paper web after leaving the press nip. The reason for this is that the water can pass through the barrier layer under pressure in the press nip, but after leaving the press nip is prevented by the barrier layer, in the absence of any pressure action, from flowing back toward the paper side. The fiber combination of materials A and B can, however, also be present in a nonwoven layer arranged in the interior of the paper machine felt, which is arranged in particular above and/or below a support. As an alternative thereto, provision is made for all the nonwoven layers to have the fiber combination according to the present invention.

It has proven to be advantageous that the nonwoven layer(s) containing the fiber combination has or have a weight per unit area of 50 to 150 g/m$^2$.

The basic concept of the invention can also be carried out, in a paper machine felt having a textile thread system, in that threads made of a material A that has a maximum water uptake of more than 10 wt % (saturation value, 23° C.), and threads made of a material B that has a water uptake of no more than 10 wt %, are provided in the thread system. The effect is substantially the same as in the case of the fiber combination described above. The threads made of the polyamide material can be part of a woven fabric, a knitted fabric, or a thread layer that is advantageously additionally arranged in the paper-side nonwoven layer. There also exists the possibility, however, that the woven fabric, knitted fabric, or thread layer having the threads made of materials A and B forms the support of the paper machine felt.

Polyamide-4 and polyamide-4,6 are suitable as material A, since this material is characterized by high water uptake (cf Ulhmanns Encyklopädie der technischen Chemie [Ullmann's Encyclopedia of Chemical Engineering], 4th ed., 1976, Vol. 11, page 296; Römpp-Chemie-Lexikon [R ömpp Chemical Dictionary], 8th ed., 1992, Vol. 5, page 3510). Particularly high water uptake values are attained, however, with polyamide-6 and polyamide-6,6 if these polyamides have poly (vinylpyrrolidone) (PVP) and/or polyetherarnide (PEA) added to them, preferably at a proportion of 3 to 18 wt %. This material combination, like polyamides and polyamide-4,6 themselves, has hitherto been recommended only for utilization in the apparel sector (EP-A-0 802 268). Depending on the proportion of PVP, a maximum water uptake of almost 20% can be attained (standard environment: 20° C., 65% relative humidity).

Polyamide materials such as polyamide-6, -6,6, -6,10, -6,12, -11, and -12, but also poly (trimethylene terephthalate) or poly (butylene terephthalate), are suitable as material B. The last-named materials, in particular, are characterized by low water uptake, so that when they are used, a definite distinction from material A can be created in terms of water uptake capability.

The invention is illustrated in more detail, with reference to two exemplary embodiments, in the drawings, in which:

FIG. 1 shows a cross section through a paper machine felt; and

FIG. 2 shows a cross section through a further paper machine felt.

Paper machine felt 1 depicted in FIG. 1 has a support 2 that is configured as a double-ply woven fabric. The woven fabric has two plies of longitudinal threads (labeled 3 and 4 by way of example), which are configured as multifilaments. Transverse threads 5 engage the plies formed by longitudinal threads 3 and 4. Support 2, in particular, absorbs the longitudinal forces acting on paper machine felt 1.

A support-side nonwoven layer 6 and a paper-side nonwoven layer 7 are needle-felted onto support 2; in operation, paper-side nonwoven layer 7 forms the surface of paper machine felt 1 facing the paper side. Paper-side nonwoven layer 7 is configured from finer fibers than support-side nonwoven layer 6. A further, machine-side nonwoven layer 8 is additionally needle-felted onto the other side of support 2.

Paper-side nonwoven layer 7 contains a proportion of polyamide-6 fibers, such as are known from EP-A-0 802 268. These fibers contain a proportion of poly (vinylpyrrolidone) (PVP) so that as compared to the original polyamide-6 material, in accordance with the proportion of PVP they have a substantially higher water uptake capability and thus a considerably greater swelling value. In operation, the liquid pressed out of the paper web causes these fibers to swell immediately after initial startup, so that the desired permeability is achieved only then. As the service life proceeds, however, the polyamide-6 fibers with added PVP decompose as a result of internal friction and chemical influences; this counteracts the tendency of the paper machine felt to density as a result of compaction and deposits, so that the permeability of the paper machine felt can be kept largely constant over its service life.

FIG. 2 depicts a paper machine felt 11 whose basic configuration is identical to that of paper machine felt 1 shown in FIG. 1; only the differences will therefore be described below, identical reference characters being used for identical parts.

Needle-felted onto support 2 is a support-side nonwoven layer 12 whose thickness is, however, less than that of nonwoven layer 6 in paper machine felt 1. Placed thereonto is a woven fabric (depicted only schematically here), onto which in turn a paper-side nonwoven layer 14 is needle-felted. Woven fabric 13 does not serve to absorb energy; rather it contains multifilaments that are made of polyamide-6 with a proportion of poly (vinylpyrrolidone). What is achieved thereby is substantially the same effect as with the fibers in paper-side nonwoven layer 7 in paper machine felt 1 shown in FIG. 1, i.e. upon startup, the multifilaments having the poly (vinylpyrrolidone) content swell up, and only then is the desired permeability obtained. Decomposition of these multifilaments counteracts the tendency toward densification as a result of compaction and deposits.

The other fibers of nonwoven layers 6, 7, 8, 12, 14 are made of polyamide-6, -11, or -12. Other plastic materials can also be used instead of or in combination with them.

What is claimed is:

1. A paper machine felt (1, 11) having at least one nonwoven layer (7) made of plastic fibers, wherein there is present in the nonwoven layer or in at least one of the nonwoven layers (7) a fiber combination in which a portion of the plastic fibers is made of a material A that has a water uptake of more than 10 wt % (saturation value, 23° C.) and in which the majority of the plastic fibers is made of a material B that has a water uptake of no more than 10 wt % (saturation value, 23° C.).

2. The paper machine felt as defined in claim 1, wherein material A is present in the relevant nonwoven layer (7) at a weight proportion of 3 to 25 wt %.

3. The paper machine felt as defined in claim 1, wherein the fiber combination is present in a paper-side nonwoven layer (7).

4. The paper machine felt as defined in one of claim 1, wherein the fiber combination is present in a nonwoven layer arranged in the interior of the paper machine felt.

5. The paper machine felt as defined in claim 1, wherein all the nonwoven layers above and/or below a support contain or are made of the fiber combination.

6. The paper machine felt as defined in claim 1, wherein the nonwoven layer(s) (7) containing the fiber combination has or have a weight per unit area of 50 to 150 g/m$^2$.

7. A paper machine felt (11) having a textile thread system (13), wherein threads made of a material A that has a maximum water uptake of more than 10 wt % (saturation value, 23° C.), and threads made of a material B that has a water uptake of no more than 10 wt %, are provided in the thread system (13).

8. The paper machine felt as defined in claim 7, wherein the thread system is part of or is made of a woven fabric (13), a knitted fabric, or a thread layer.

9. The paper machine felt as defined in claim 8, wherein the felt has a paper side nonwoven layer and the woven fabric (13), knitted fabric, or thread layer is arranged in the paper-side nonwoven layer (12, 14).

10. The paper machine felt as defined in claim 7, wherein the woven fabric (13), knitted fabric, or thread layer forms the support of the paper machine felt (11).

11. The paper machine felt as defined in claim 1, wherein material A is polyamide-4 and/or polyamide-4,6 and/or is a polyamide that contains poly (vinylpyrrolidone) and/or polyetheramide.

12. The paper machine felt as defined in claim 11, wherein the polyamide that contains poly (vinylpyrrolidone) and/or polyetheramide is a polyamide-6 or polyamide-6,6.

13. The paper machine felt as defined in claim 11, wherein the poly (vinylpyrrolidone) is present at a proportion of 3 to 18 wt %.

14. The paper machine felt as defined in claim 1, wherein material B is a polyamide material such as polyamide-6, polyamide-6,6, polyamide-6,10, polyamide-6,12, polyamide-11, polyamide-12, or poly (trimethylene terephthalate) or poly (butylene terephthalate).

* * * * *